United States Patent Office 3,578,470
Patented May 11, 1971

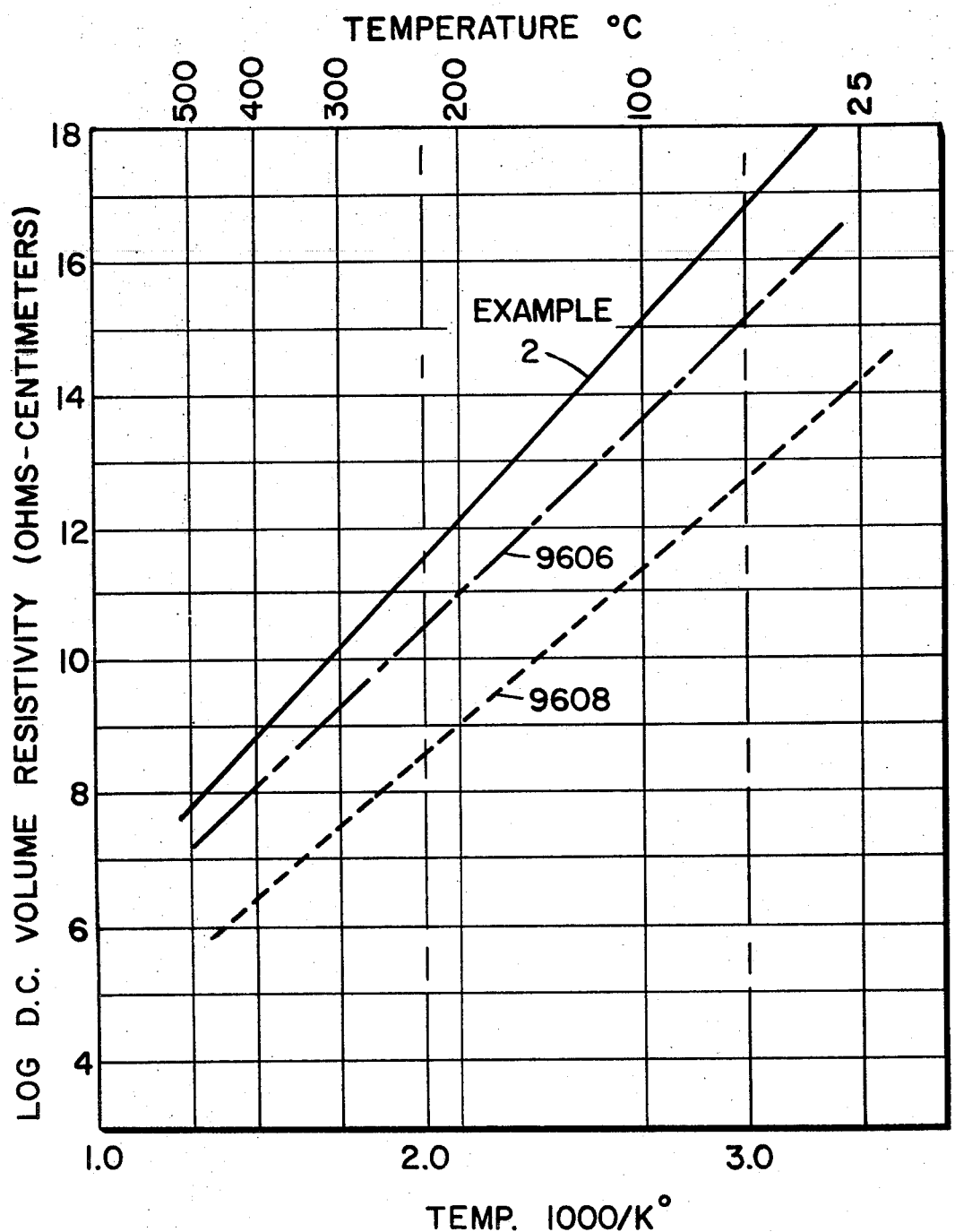

---

3,578,470
BaO-Al₂O₃-SiO₂ GLASS-CERAMIC MATERIALS
Dov Bahat, 77 E. 1st St., Corning, N.Y. 14830, and Gordon P. K. Chu, 1 Overbrook Road, Painted Post, N.Y. 14870
Filed Nov. 12, 1968, Ser. No. 774,687
Int. Cl. C03c 3/22
U.S. Cl. 106—39     2 Claims

ABSTRACT OF THE DISCLOSURE

This invention relates to the production of glass-ceramic materials in the composition field $BaO\text{-}Al_2O_3\text{-}SiO_2$ nucleated with $Ta_2O_5$ and/or $Nb_2O_5$ which are especially suitable for sealing to tungsten and/or molybdenum metal and their alloys.

---

The production of glass-ceramic articles is founded upon the crystallization in situ of glass articles. Thus, a glass-forming batch to which a nucleating agent is commonly admixed is melted, the melt cooled to a glass and an article of a desired configuration shaped therefrom, and this glass shape then subjected to a particular heat treatment such that nuclei are initially formed within the glass which provide sites for the growth of crystals thereon as the heat treatment is continued.

Inasmuch as the crystallization in situ is brought about through the substantially simultaneous growth of crystals upon countless nuclei, the resultant product consists essentially of relatively uniformly fine-grained crystals homogeneously dispersed in a residual glassy matrix, the crystals comprising the predominant proportion of the article. Thus, glass-ceramic articles are generally defined as being greater than 50% by weight or by volume crystalline and, in many instances, are actually greater than 90% by weight or by volume crystalline. This very high crystallinity yields a product exhibiting chemical and physical properties which are commonly quite different from those of the parent glass but are more nearly characteristic of those manifested by a crystalline article. Yet, because the article was originally a glass, the conventional methods for forming glass articles of different configurations can be employed and the crystallized body is essentially free of voids and non-porous. Finally, the very high crystallinity of the glass-ceramic article results in the residual glassy matrix having a quite different composition from that of the parent glass since the components constituting the crystal phase will have been precipitated therefrom.

For a more complete explanation of the theoretical concepts and the practical considerations involved in the production of glass-ceramic articles, reference is made to U.S. Pat. No. 2,920,971. It will be readily apparent from a study of that patent that the crystal phases developed in glass-ceramic articles are related to the composition of the parent glass and the heat treatment to which the glass is exposed.

There are two fundamental mechanical requirements for a glass-ceramic-to-metal seal. First, the seal therebetween must be made leakage-proof and absolutely impervious. Second, the seal must exhibit adequate strength for the application intended. It will be appreciated, then, that to satisfy these two requirements the seal must be essentially free from tension stresses which could lead to cracks or checks. Therefore, a reasonably good match between the thermal expansion of the glass-ceramic and that of the metal is mandatory. The average coefficient of thermal expansion of tungsten and/or molybdenum and their alloys generally varies between about $44\text{-}56 \times 10^{-7}$ /° C. ($25°\text{-}1000°$ C.)

Molybdenum and/or tungsten metal and their alloys have been used extensively in the fabrication of electrical and electronic components or devices with hermetic seals. The melting points of molybdenum and tungsten are very high (about $2600°$ C. for molybdenum and about $3410°$ C. for tungsten) such that their electrical and mechanical properties could be utilized in very high temperature applications if a sound strong seal could be developed between the molybdenum and/or tungsten and the enclosing refractory material. It will also be recognized that the electrical insulating properties of the sealing materials are extremely important in these applications. Thus, the preferred compositions will exhibit a wide range of dielectric constants which will be appropriate for various specific applications, low dissipation factors, and high volume resistivities. However, since the sealing with molybdenum and tungsten must be undertaken in a non-oxidizing or reducing atmosphere, the electrical and mechanical properties of the material forming the seal should, preferably, be totally unaffected when exposed to non-oxidizing or reducing conditions at elevated temperatures. $TiO_2$-nucleated glass-ceramic materials, specifically referred to in Pat. No. 2,920,971 cited above and presently enjoying the most widespread commercial use in a variety of products, are quite sensitive to heating in reducing environments and, hence, are not well suited for sealing to molybdenum.

Therefore, the primary object of the instant invention is to provide a glass-ceramic material exhibiting excellent thermal stability at high temperatures and eminently satisfactory electrical and mechanical properties during and after being exposed to non-oxidizing or reducing conditions at elevated temperatures.

Another object of this invention is to provide a glass-ceramic material exhibiting excellent electrical insulating properties and having a coefficient of thermal expansion compatible with that of molybdenum and/or tungsten metal and their alloys.

Other objects will be apparent from the following description of the invention and from the accompanying drawing which graphically compares the D.C. volume resistivity at various temperatures of a material made in accordance with the present invention with two commercially available, $TiO_2$-nucleated glass-ceramic materials.

We have discovered that these objects can be attained through glass-ceramic materials in the $BaO\text{-}Al_2O_3\text{-}SiO_2$ field which employ $Ta_2O_5$ and/or $Nb_2O_5$ as nucleating agents. Thus, in its broadest terms, our invention comprises melting a batch for a glass consisting essentially, in weight percent on the oxide basis, of about 10–30% BaO, 5–30% $Al_2O_3$, 15–50% $SiO_2$, and 5–60% $M_2O_5$, wherein $M_2O_5$ consists of 0–50% $Nb_2O_5$ and 0–60% $Ta_2O_5$, simultaneously cooling the melt to a glass and shaping an article of a desired configuration therefrom, and then crystallizing the glass article in situ by first heating it to the nucleation range ($750°\text{-}950°$ C.) for a sufficient period of time to insure the substantial development of nuclei and then heating it to the crystallization range (950°–1400° C.) and maintained within that temperature range for a sufficient length of time to cause a major proportion of the glass to crystallize.

Table I reports examples of thermally crystallizable glasses having compositions within the above-delineated ranges of compositions, expressed in weight percent on the oxide basis, which are operable in this invention. It will be appreciated that the batch ingredients for these glasses can comprise any materials, either the oxides or other compounds which, on being melted together, are converted to the desired oxide composition in the proper proportions. The batch materials were dry ballmilled together to aid in securing a homogeneous melt, placed in open platinum crucibles, and melted for about 4–16 hours at 1550°–1700° C. Glass cane about ¼" in diameter was hand-drawn from the melt and the rest was poured onto a steel plate to form a round patty about ⅜" thick and about 5" in diameter. The glass articles were immediately transferred to an annealer operating at about 650°–800° C.

TABLE I
[Percent]

| | 1 | 2 | 3 | 4 | 5 | 6 | 7 | 8 | 9 | 10 | 11 | 12 |
|---|---|---|---|---|---|---|---|---|---|---|---|---|
| $SiO_2$ | 24.5 | 32.6 | 24.5 | 23.5 | 23.5 | 32.6 | 35.9 | 34.3 | 24.5 | 46.0 | 17.0 | 17.0 |
| $Al_2O_3$ | 11.5 | 15.4 | 11.5 | 11.5 | 11.5 | 15.3 | 19.9 | 16.5 | 11.5 | 10.0 | 17.0 | 23.0 |
| BaO | 14.0 | 18.7 | 13.0 | 13.0 | 12.0 | 18.7 | 24.1 | 19.5 | 14.0 | 10.0 | 27.0 | 13.0 |
| $Ta_2O_5$ | 50.0 | 33.3 | 50.0 | 50.0 | 50.0 | 16.7 | | 5.8 | | 34.0 | 39.0 | 47.0 |
| $Nb_2O_5$ | | | | | | 16.7 | 20.1 | 17.1 | 50.0 | | | |
| $ZrO_2$ | | | | | | | | 4.8 | | | | |
| $TiO_2$ | | | | | | | | 1.7 | | | | |
| MgO | | | 1.0 | 1.0 | 1.0 | | | | | | | |
| $P_2O_5$ | | | | 1.0 | 1.0 | | | | | | | |
| $K_2O$ | | | | | 1.0 | | | | | | | |

These glasses nucleate rather rapidly so that where relatively thin-walled materials are to be crystallized in situ exposure of such articles within the nucleation range for periods as short as 15 minutes may be quite adequate. Much longer nucleation periods, such as 1–12 hours, can be satisfactorily employed and crystals will begin to grow on these nuclei when extended nucleation times are utilized. However, such practice is not commercially attractive and the glass article is commonly held within the nucleation range for only the period necessary to secure good nucleation and the article is then heated to higher temperatures to expedite crystal growth. Therefore, ¼–4 hours within the nucleation range is generally sufficient to insure adequate nucleation in the glass article.

The growth of crystals upon the nuclei of $Ta_2O_5$ and/or $Nb_2O_5$ is likewise quite rapid at temperatures within the above-stated crystallization range and with thin-walled articles times as brief as ¼ hour may be adequate to produce highly crystalline bodies containing hexacelsian ($BaO \cdot Al_2O_3 \cdot 2SiO_2$) and a $Ta_2O_5$ and/or $Nb_2O_5$-rich crystals as the primary crystal phases. Much longer crystallization times may be employed successfully but, commonly, commercial production dictates the use of the shortest periods that will result in a satisfactorily crystallized article with the desired crystal phases present therein. Thus, 24 hours has been deemed to be a practical maximum crystallization period with about 1–8 hours generally being utilized.

In crystallizing the examples of Table I, the glass articles were heated to the nucleation range and subsequently to the crystallization range at about 300° C./hour. It will be appreciated that slower or faster temperature increases will be operable where very thick or very thin shapes, respectively, are being heat treated. However, the 300° C./hour rate of temperature increase has been adjudged to be satisfactory, in most instances, for preventing breakage resulting from thermal shock and excessive deformation of the glass article as it is being heated above its softening point and before crystallization has proceeded to a sufficient extent to support the article.

Crystallization of the glass article is effected more rapidly as the temperature is raised. Therefore, in the early stages of crystallization, the proportion of glassy matrix to crystals is very great and the article will readily deform if the temperature thereof is increased too rapidly as the softening point of the glass is approached and exceeded. Hence, the rate at which the temperature is increased should, preferably, balance the rate at which crystals are growing within the glass with the necessary degree of fluidity in the residual glassy matrix to avoid stress build-up and cracking. In the light of this situation, then, it will be recognized that no dwell periods, as such, within the nucleation and crystallization temperature ranges are mandatory but, rather, only a schedule wherein the article moves within and through the nucleation temperature zone and is then maintained within the crystallization range. Nevertheless, the employment of finite dwell times within the two temperature zones insures the required nucleation and subsequent crystal growth, and, therefore, constitutes the preferred practice of the invention.

The rate of cooling the crystallized article to room temperature is also dependent upon its resistance to thermal shock and here, again, the dimensions of the article and the final heat treating temperature utilized dictate the cooling rate selected. A 300° C./hour cooling rate has produced sound products in all of the articles tried by us. Much more rapid rates of cooling can be utilized with thin-walled articles with no breakage resulting therefrom and, in many instances, the crystallized articles were merely removed directly from the heat treating chamber and allowed to cool in the ambient atmosphere.

Finally, where fuel economies and speed of production are sought in manufacturing the glass-ceramic articles, the glass shapes need not be cooled all the way to room temperature and thereafter reheated into the nucleation and crystallization zones. The cooling of the glass shapes to room temperature allows visual inspection of the glass quality thereof. Rather, the glass melt may be simply cooled to just below the transformation range thereof and a glass article of a desired configuration shaped therefrom (the transformation range being that temperature at which a liquid melt is considered to have been transformed into an amorphous solid), and this glass article then exposed to the requisite heat treating schedule. The transformation range is a temperature in the vicinity of the annealing point of a glass which, with the compositions of this invention, ranges about 650°–800° C.

Table II records the heat treatment schedules to which cane and patty samples of each example of Table I were subjected along with the crystal phases present therein as determined by X-ray diffraction analysis, the average coefficient of thermal expansion (25°–1000° C.) as measured in the conventional manner utilizing a differential dilatometer, and several measurements of dielectric constants, loss tangents, and volume resistivities determined in the conventional manner. Electron microscopy demonstrated the crystallized articles to be highly crystalline, viz., greater than about 75% by volume crystalline, and in some instances greater than 90% by volume crystalline. The crystals, themselves, were substantially all finer than 1 micron in diameter with the preferred size being less than ½ micron in diameter. Visual inspection of the cane samples showed them to be dense white, opaque, bodies having a fine-grained structure.

TABLE II

| Example No. | Heat treatment | Crystal phases | Exp. coeff. ($\times 10^{-7}/°$ C.) | Dielectric constant | |
|---|---|---|---|---|---|
| 1 | Heat at 300° C./hr. to 1,000° C.; hold at 1,000° C. for 2 hours | Hexacelsian, $Ta_2O_5$-rich phase | 45.6 | 100 c.p.s.: 25° C — 10.8; 106° C — 10.9; 184° C — 11.9. 10,000 c.p.s.: 25° C — 10.8; 106° C — 10.8; 304° C — 11.7 | |
| 2 | Heat at 300° C./hr. to 1,150° C.; hold at 1,150° C. for 2 hours | Hexacelsian, $Ta_2O_5$-rich phase | 48.0 | 100 c.p.s., 25° C — 9.7; 1 kc., 304° C — 10.1 | |
| 3 | Heat at 300° C./hr. to 1,150° C.; hold at 1,150° C. for 2 hours | Hexacelsian, $Ta_2O_5$-rich phase | 49.0 | | |
| 4 | Heat at 300° C./hr. to 1,150° C.; hold at 1,150° C. for 1 hour | Hexacelsian, $Ta_2O_5$-rich phase | 46.0 | | |
| 5 | Heat at 300° C./hr. to 1,150° C.; hold at 1,150° C. for 1 hour | Hexacelsian, $Ta_2O_5$-rich phase | 50.8 | | |
| 6 | Heat at 300° C./hr. to 1,000° C.; hold at 1,000° C. for 16 hours | Hexacelsian, $Ta_2O_5$ and $Nb_2O_5$-rich phase. | 49.5 | 100 c.p.s.: 25° C — 11.98; 245° C — 15.57. 10,000 c.p.s.: 25° C — 11.95; 500° C — 19.84. 1 mc.: 25° C — 11.70; 500° C — 12.63 | |
| 7 | Heat at 300° C./hr. to 1,150° C.; hold at 1,150° C. for 2 hours | Hexacelsian, $Nb_2O_5$-rich phase | 54.7 | 100 c.p.s.: 25° C — 11.9; 240° C — 33.2. 10,000 c.p.s.: 25° C — 11.8; 240° C — 14.5; 345° C — 26.3. 1 mc.: 25° C — 11.8; 240° C — 12.1; 345° C — 13.6 | |
| 8 | Heat at 300° C./hr. to 1,100° C.; hold at 1,100° C. for 2 hours | Hexacelsian, $Nb_2O_5$-rich phase | | | |
| 9 | Heat at 300° C./hr. to 1,100° C.; hold at 1,100° C. for 1 hour | Hexacelsian, $Nb_2O_5$-rich phase | | 100 c.p.s., 25° C — 79.0. 10,000 c.p.s.: 25° C — 25.1; 61° C — 39.2. 100,000 c.p.s.: 25° C — 23.1; 120° C — 28.8 | |
| 10 | Heat at 300° C./hr. to 1,100° C.; hold at 1,100° C. for 1 hour | Hexacelsian, $Ta_2O_5$-rich phase | | | |
| 11 | Heat at 300° C./hr. to 1,100° C.; hold at 1,100° C. for 1 hour | Hexacelsian, $Ta_2O_5$-rich phase | | | |
| 12 | Heat at 300° C./hr. to 1,100° C.; hold at 1,100° C. for 1 hour | Hexacelsian, $Ta_2O_5$-rich phase | | | |

| Example No. | Loss tangent | Volume resistivity log (ohm/cm.) |
|---|---|---|
| 1 | 100 c.p.s.: 25° C — 0.0016; 106° C — 0.0079; 184° C — 0.046. 10,000 c.p.s.: 25° C — 0.0012; 106° C — 0.0026; 304° C — 0.076 | 106° C — 13.98; 304° C — 9.40; 502° C — 7.25 |
| 2 | 1,000 c.p.s.: 25° C — 0.0012; 201° C — 0.012; 304° C — 0.093 | 106° C — 15.2; 304° C — 10.1; 502° C — 7.8 |
| 6 | 100 c.p.s.: 25° C — 0.0019; 245° C — 0.33. 10,000 c.p.s.: 25° C — 0.0010; 397° C — 0.39. 1 mc. c.p.s.: 500° C — 0.0005, 0.078 | 245° C — 10.27; 345° C — 8.63; 397° C — 8.14; 500° C — 7.27 |
| 7 | 100 c.p.s.: 25° C — 0.005; 201° C — 0.36; 240° C — 0.56. 10,000 c.p.s.: 25° C — 0.002; 200° C — 0.19; 345° C — 0.46. 1 mc.: 25° C — 0.0012; 296° C — 0.057; 440° C — 0.30 | 201° C — 10.63; 295° C — 8.87; 430° C — 7.15 |
| 8 | 100 c.p.s., 25° C — 0.76. 10,000 c.p.s.: 25° C — 0.23; 61° C — 0.41. 100,000 c.p.s.: 25° C — 0.03; 120° C — 0.35 | 25° C — 9.97; 120° C — 8.30; 243° C — 7.25; 376° C — 6.29 |

The composition of the thermally crystallizable glass is critical in assuring the requisite crystallinity in the product and the necessary presence of hexacelsian and a $Ta_2O_5$ and/or $Nb_2O_5$-rich crystal as the primary crystal phases such that a glass-ceramic article exhibiting excellent electrical properties and an average coefficient of thermal expansion (commonly between about 39–58×10$^{-7}$/° C.) compatible with that of molybdenum and/or tungsten and their alloys is developed. Hence, while very minor amounts of such compatible metal oxides as $Li_2O$, $Na_2O$, $K_2O$, MgO, CaO, SrO, ZnO, $Fe_2O_3$, $B_2O_3$, $P_2O_5$, and PbO may be tolerated, the total amount of such additionals should, desirably, not exceed about 10% by weight and their absence is preferred.

Thus, the alkali metal ions adversely affect the electrical properties of the crystallized articles and also are prone to develop a residual glass that can reduce the thermal stability of the articles. Since hexacelsian is a very compact crystal structure, it cannot accommodate significant amounts of such oxides as MgO, CaO, SrO, and ZnO. Substantial amounts of PbO, $B_2O_3$, and $P_2O_5$ lead to the increased formation of a residual glass which can deleteriously affect the thermal stability of the glass-ceramic. Also, these three oxides along with the alkali metal oxides have a great effect upon the coefficient of thermal expansion exhibited by the finished article. Very minor amounts of $TiO_2$ and $ZrO_2$ may be employed as secondary nucleants but the sensitivity of $TiO_2$ to reducing atmospheres has been explained above. Further, since the proper combination of hexacelsian with a low expansion $Ta_2O_5$ and/or $Nb_2O_5$-rich phase is demanded to secure a glass-ceramic article having the desired physical propetries, $TiO_2$ and/or $ZrO_2$ cannot be utilized alone as the nucleating agent.

The appended drawing illustrates the superior electrical properties exhibited by the materials of our invention when compared with two $TiO_2$-nucleated glass-ceramics widely used in commerce. In this graph, the log of the D.C. volume resistivity is plotted against temperature, the temperature being denoted as 1000° K. Thus, across the top of the graph, the actual temperature in degrees centigrade is recorded whereas the straight line curves reflect the plot at temperatures defined in 1000 degrees Kelvin as reported at the bottom of the graph. The significant improvement in D.C. volume resistivity demonstrated by Example 2 when compared to Corning Codes 9606 and 9608 is readily apparent.

The thermally crystallizable glasses of this invention, when applied to molybdenum metal and/or tungsten and their alloys in the form of wire, sheet, or rod, exhibit excellent stability with good bonding at the glass or glass-ceramic and metal interface. The heat treating schedule, however, must be carried out under controlled non-oxidizing conditions or under a vacuum. The fine-grained composites of glass-ceramic and molybdenum and/or tungsten metal may be fabricated utilizing conventional forming processing such as pressing, dipping, and spinning or a slurry of the powdered glass may be applied as a coating thereon by spraying with a liquid vehicle or powder dusting and then fired to fuse to the metal and crystallize in situ. Nevertheless, no matter how formed, the composite articles may be cycled repeatedly in a non-oxidizing atmosphere from room temperature to 1250°–1400° C. without failure.

Whereas this invention has been described in terms of sealing glass-ceramic material to molybdenum and/or tungsten metal and alloys thereof and that is certainly the prime function of the invention, it will be readily appreciated that seals can also be made with glasses, ceramics, and other glass-ceramics having coefficients of thermal expansion compatible with those of the subject invention. Thus, for example, a three-part unit can be made through the sealing of molybdenum and/or tungsten metal to one end of a bar of glass-ceramic material of this invention and Corning Code 7720 glass (expansion coefficient of $36 \times 10^{-7}/°$ C.) to the other.

Example 2 represents the preferred embodiment of the invention since the crystallization therein is uniformly very fine-grained, the electrical properties thereof are excellent, a strong, hermetic seal is developed between the glass-ceramic and molybdenum and/or tungsten metal, and the composite of glass-ceramic and molybdenum and/or tungsten metal can be cycled repeatedly from room temperature to about 1400° C. without breakage.

We claim:

1. A thermally crystallizable glass consisting essentially, by weight on the oxide basis, of about 10–30% BaO, 5–30% $Al_2O_3$, 15–50% $SiO_2$, and 5–60% of a nucleating agent, said nucleating agent consisting of 0–50% $Nb_2O_5$ and 0–60% $Ta_2O_5$.

2. A glass-ceramic article having an average coefficient of thermal expansion (25°–1000° C.) between about 39–58×10$^{-7}/°$ C. consisting essentially of fine-grained crystals of hexacelsian and a $Ta_2O_5$ and/or $Nb_2O_5$-rich phase uniformly dispersed in a glassy matrix, said crystals comprising at least 75% by volume of the article and being formed through the crystallization in situ of a glass article consisting essentially, by weight on the oxide basis, of about 10–30% BaO, 5–30% $Al_2O_3$, 15–50% $SiO_2$, and 5–60% of a nucleating agent, said nucleating agent consisting of 0–50% $Nb_2O_5$ and 0–60% $Ta_2O_5$.

References Cited

UNITED STATES PATENTS

| | | | |
|---|---|---|---|
| 3,113,877 | 12/1963 | Janakirama-Rao | 106—39 |
| 3,114,066 | 12/1963 | Allen et al. | 106—39 |
| 3,201,266 | 8/1965 | MacDowell | 106—39 |
| 3,293,017 | 12/1966 | Jenkins | 106—39 |

HELEN M. McCARTHY, Primary Examiner

U.S. Cl. X.R.

65—33; 106—52

UNITED STATES PATENT OFFICE
CERTIFICATE OF CORRECTION

Patent No. 3,578,470　　　　　　　　Dated May 11, 1971

Inventor(s) Dov Bahat and Gordon P. K. Chu

It is certified that error appears in the above-identified patent and that said Letters Patent are hereby corrected as shown below:

Column 1, line 5, insert -- , assignors to Corning Glass Works, Corning, N. Y. --.

Column 5, line 61, Table II, insert -- 25°C. --.

Column 5, line 71, Table II, under heading "Example No.", change "8" to -- 9 --.

Column 6, line 56, change "additionals" to --additions--.

Signed and sealed this 22nd day of February 1972.

(SEAL)
Attest:

EDWARD M. FLETCHER, JR.　　　　　ROBERT GOTTSCHALK
Attesting Officer　　　　　　　　　Commissioner of Patents